US011676006B2

(12) United States Patent
Das et al.

(10) Patent No.: US 11,676,006 B2
(45) Date of Patent: Jun. 13, 2023

(54) UNIVERSAL ACOUSTIC MODELING USING NEURAL MIXTURE MODELS

(71) Applicant: Microsoft Technology Licensing, LLC, Redmond, WA (US)

(72) Inventors: Amit Das, Redmond, WA (US); Jinyu Li, Redmond, WA (US); Changliang Liu, Bothell, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 931 days.

(21) Appl. No.: 16/414,378

(22) Filed: May 16, 2019

(65) Prior Publication Data
US 2020/0334527 A1    Oct. 22, 2020

Related U.S. Application Data

(60) Provisional application No. 62/834,569, filed on Apr. 16, 2019.

(51) Int. Cl.
*G06N 3/08* (2023.01)
*G10L 15/16* (2006.01)
*G10L 15/22* (2006.01)
*G06N 3/04* (2023.01)

(52) U.S. Cl.
CPC .................. *G06N 3/08* (2013.01); *G06N 3/04* (2013.01); *G10L 15/16* (2013.01); *G10L 15/22* (2013.01)

(58) Field of Classification Search
CPC ........... G01L 15/16; G10L 15/22; G06N 3/08; G06N 3/04
See application file for complete search history.

(56) References Cited

U.S. PATENT DOCUMENTS

| | | | |
|---|---|---|---|
| 2017/0148433 A1 | 5/2017 | Catanzaro et al. | |
| 2018/0308487 A1* | 10/2018 | Goel | ................... G10L 15/1815 |

OTHER PUBLICATIONS

Convolutional, Long Short-Term Memory, Fully Connected Deep Neural Networks (Year: 2015).*
RADMM: Recurrent Adaptive Mixture Model With Applications To Domain Robust Language Modeling (Year: 2018).*
Mixture of Experts with Entropic Regularization for Data Classification (Year: 2019).*

(Continued)

*Primary Examiner* — Mohammad K Islam
(74) *Attorney, Agent, or Firm* — Workman Nydegger

(57) ABSTRACT

According to some embodiments, a universal modeling system may include a plurality of domain expert models to each receive raw input data (e.g., a stream of audio frames containing speech utterances) and provide a domain expert output based on the raw input data. A neural mixture component may then generate a weight corresponding to each domain expert model based on information created by the plurality of domain expert models (e.g., hidden features and/or row convolution). The weights might be associated with, for example, constrained scalar numbers, unconstrained scaler numbers, vectors, matrices, etc. An output layer may provide a universal modeling system output (e.g., an automatic speech recognition result) based on each domain expert output after being multiplied by the corresponding weight for that domain expert model.

21 Claims, 12 Drawing Sheets

(56) References Cited

OTHER PUBLICATIONS

A Mixture of Experts Approach Towards Intelligibility Classification of Pathological Speech (Year: 2015).*
Multilingual Sequence-to-Sequence Speech Recognition: Architecture, Transfer Learning, and Language Modeling (Year: 2018).*
Multilingual Speech Recognition With a Single End-To-End Model (Year: 2018).*
Adaptive Mixture of local Experts (Year: 1988).*
1-D Row-Convolution LSTM: Fast Streaming ASR at Accuracy Parity with LC-BLSTM (Year: 2020).*
Lattice Rescoring Strategies for Long Shortterm Memory Language Models in Speech Recognition (Year: 2017).*
Universal Acoustic Modeling Using Neural Mixture Models (Year: 2019).*
Effective Attention Mechanism in Dynamic Models for Speech Emotion Recognition; Published in: 2018 IEEE International Conference on Acoustics, Speech and Signal Processing (ICASSP) (Year: 2018).*
Abdel-Hamid, Ossama et al., "Convolutional Neural Networks for Speech Recognition", In Proceedings of IEEE/ACM Transactions on Audio, Speech, and Language Processing, vol. 22, Issue 10, Oct. 2014, (pp. 1533-1545, 13 total pages).
Bahdanau, Dzmitry et al., "End-to-End Attention-Based Large Vocabulary Speech Recognition", In Proceedings of the 2016 IEEE International Conference on Acoustics, Speech and Signal Processing, Aug. 2015, 8 Pages.
Bahdanau, Dzmitry et al., "Neural Machine Translation by Jointly Learning to Align and Translate", In Proceeding of International Conference on Learning Representations, May 2015, 15 Pages.
Chazan, Shlomo E. et al., "Deep Recurrent Mixture of Experts for Speech Enhancement", In Proceedings of IEEE Workshop on Applications of Signal Processing to Audio and Acoustics, Oct. 15, 2017, 5 Pages.
Chorowski, Jan et al., "Attention-Based Models for Speech Recognition", In Proceedings of th Conference on Neural Information Processing Systems, Dec. 7, 2015, 9 Pages.
Dahl, George E. et al., "Context-Dependent Pre-Trained Deep Neural Networks for Large-Vocabulary Speech Recognition", In Proceedings of the IEEE Transactions on Audio, Speech, and Language Processing, vol. 20, Issue 1, Jan. 2012, DOI: 10.1109/TASL.2011.2134090, (pp. 30-42, 13 total pages).
Das, Amit et al., "Advancing Connectionist Temporal Classification with Attention Modeling", In the Proceedings of International Conference on Acoustics, Speech and Signal Processing, Apr. 15, 2018, 5 Pages.
Eigen, David et al., "Learning Factored Representations in a Deep Mixture of Experts", In Proceeding of International Conference on Learning Representations, Apr. 2014, 8 Pages.
Sales, Mark J. F. "Cluster Adaptive Training of Hidden Markov Models", In Proceedings of the IEEE Transactions on Speech and Audio Processing, vol. 8, Issue 4, Jul. 2000, (pp. 417-428, 12 total pages).
Hinton, Geoffrey et al., "Deep Neural Networks for Acoustic Modeling in Speech Recognition: The Shared Views of Four Research Groups", In Proceedings of the IEEE Signal Processing Magazine, vol. 29, Issue 6, Nov. 1, 2012, DOI: 10.1109/MSP.2012.2205597, (pp. 82-97, 16 total pages).
Hochreiter, Sepp et al., "Long Short-Term Memory", In Journal of Neural Computation, vol. 9, Issue 8, Nov. 15, 1997, 32 Pages.
Irie, Kazuki et al., "RADMM: Recurrent Adaptive Mixture Model with Applications to Domain Robust Language Modeling", In Proceedings of the IEEE International Conference on Acoustics, Speech and Signal Processing, Apr. 15, 2018, 5 Pages.
Jacobs, Robert et al., "Adaptive Mixture of Local Experts", In Journal of Neural Computation, vol. 3 Issue 1, Mar. 1, 1991, (pp. 79-87, 9 total pages).
Jordan, Michael I. et al., "Hierarchical Mixture of Experts and the EM Algorithm", In Proceedings of International Joint Conference on Neural Networks, vol. 6, Issue 2, Mar. 1994, 34 Pages.
Kim, Young-Burn et al., "Domain Attention with an Ensemble of Experts", In Proceedings of Annual Meeting of the Association for Computational Linguistics, Jul. 28, 2017, (pp. 643-653, 11 total pages).
Li, Jinyu et al., "Advancing Acoustic-to-Word CTC Model", In the Proceedings of International Conference on Acoustics, Speech and Signal Processing, Apr. 15, 2018, 5 Pages.
Mallidi, Sri Harish et al., "Autoencoder Based Multi-stream Combination for Noise Robust Speech Recognition", In Proceedings of the 16th Annual Conference of the International Speech Communication Association, Sep. 6, 2015, (pp. 3551-3555, 5 total pages).
Miao, Yajie et al., "Simplifying Long Short-term Memory Acoustic Models for Fast Training and Decoding", In Proceedings of the IEEE International Conference on Acoustics, Speech and Signal Processing, Mar. 20, 2016, (pp. 2284-2288, 5 total pages).
Sak, Hasim et al., "Long Short-term Memory Recurrent Neural Network Architectures for Large Scale Acoustic Modeling", In Proceedings of the Fifteenth Annual Conference of the International Speech Communication Association, Sep. 14, 2014, 5 Pages.
Tani, Jun et al., "Learning to Perceive the World as Articulated: An Approach for Hierarchical Learning in Sensory-Motor Systems", In Journal of Neural Networks vol. 12, Issues 7-8, Oct. 1999, (pp. 1131-1141, 32 total pages).
Vinyals, Oriol et al., "Revisiting Recurrent Neural Networks for Robust ASR", In Proceedings of the IEEE International Conference on Acoustics, Speech and Signal Processing, Mar. 25, 2012, (pp. 4085-4088, 4 total pages).
Yu, Dong et al., "Feature Learning in Deep Neural Networks—Studies on Speech Recognition Tasks", In Proceedings of the International Conference on Learning Representations, May 2013, 9 Pages.
Yu, Dong et al., "Recent Progresses in Deep Learning Based Acoustic Models", In IEEE/CAA Journal of Automatica Sinica, vol. 4, Issue 3, Jul. 2017, DOI: 10.1109/JAS.2017.7510508, (pp. 400-413, 14 total pages).
Yu, Kai et al., "Discriminative Cluster Adaptive Training", In Proceedings of the IEEE Transactions on Audio, Speech, and Language Processing, vol. 14, Issue 5, Sep. 2006, DOI: 10.1109/TSA.2005.85855, (pp. 1694-1703, 10 total pages).
Das, Amit et al., "Universal Acoustic Modeling Using Neural Mixture Models", In Proceedings of the IEEE International Conference on Acoustics, Speech and Signal Processing, May 12, 2019, 5 Pages.
Garmash, et al., "Ensemble learning for multi-source neural machine translation", In Proceedings of COLING, the 26th International Conference on Computational Linguistics: Technical Papers, Oct. 11, 2016, pp. 1409-1418.
"International Search Report and Written Opinion Issued in PCT Application No. PCT/US20/020718", dated Jun. 19, 2020, 11 Pages.

* cited by examiner

UNIVERSAL ACOUSTIC MODELING USING NEURAL MIXTURE MODELS

CROSS-REFERENCE TO RELATED APPLICATIONS

The present application claims the benefit of U.S. Provisional Patent Application No. 62/834,569 entitled "UNIVERSAL ACOUSTIC MODELING USING NEURAL MIXTURE MODELS" and filed Apr. 16, 2019. The entire content of that application is incorporated herein by reference.

BACKGROUND

Some expert models, such as acoustic models, are domain dependent and do not perform well if there is a mismatch between training and test conditions. For example, if a different type of voice or microphone is used, an acoustic model may find it difficult to recognize utterances. As an alternative, a Mixture of Experts ("MoE") model may be utilized for multi-domain modeling. Such an approach combines the outputs of several domain specific models (or experts) that are combined or "mixed" using a gating network. However, one drawback of typical MoE systems is that the gating network uses raw inputs directly and is not aware of the state of the expert models. As a result, the system's performance may suffer. What is needed are systems and methods to accurately and efficiently improve domain expert model output mixing.

SUMMARY

This summary is provided to introduce a selection of concepts in a simplified form that are further described below in the detailed description section. This summary is not intended to identify all key or essential features of the claimed subject matter, nor is it intended as an aid in determining the scope of the claimed subject matter.

Systems, methods, and computer readable storage devices embodying instructions for improved domain expert model mixing are provided herein. In some embodiments, a universal modeling system may include a plurality of domain expert models to each receive raw input data (e.g., a stream of audio frames containing speech utterances) and provide a domain expert output based on the raw input data. A neural mixture component may then generate a weight corresponding to each domain expert model based on information created by the plurality of domain expert models (e.g., hidden features and/or row convolution). The weights might be associated with, for example, constrained scalar numbers, unconstrained scaler numbers, vectors, matrices, etc. An output layer may provide a universal modeling system output (e.g., an automatic speech recognition result) based on each domain expert output after being multiplied by the corresponding weight for that domain expert model.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

DETAILED DESCRIPTION

The following description is provided to enable any person in the art to make and use the described embodiments. Various modifications, however, will remain readily apparent to those in the art.

Recent advances in speech recognition have been mostly the result of the introduction of deep learning algorithms such as Deep Neural Networks ("DNNs"), Convolutional Neural Networks ("CNNs"), and Recurrent Neural Networks ("RNNs"). However, one fundamental limitation for neural networks to work well is that the joint distribution of the acoustics and the labels in the training data must match the distribution of the test data. If not, they tend to perform poorly. Thus, Acoustic Models ("AMs") tend to be highly domain dependent and domain specific and expert AMs need to be built individually for each domain. This hinders the deployment of AMs in the real-world due to the presence of a wide variety of domains. One way to alleviate this problem is to train a global model with data from K possible domains. A drawback of the global model is that it does not perform on par with a domain-specific expert model. Moreover, the number of parameters and the training times tend to increase by several orders of magnitude. Yet another problem is that when additional amounts of data become available, the global model needs to be retrained from scratch. A better solution is to combine the outputs of several pre-trained experts using a small gating network (e.g., a switch or mixer) thereby reducing computational times and complexity. A MoE model may use a gating network to map input data to a probability distribution over the experts, which is referred to as "mixture weights." The mixture weights determine the degree of relevance between the experts and the input data. The expert outputs may then be linearly combined using the mixture weights to produce a final output.

Figure 1:
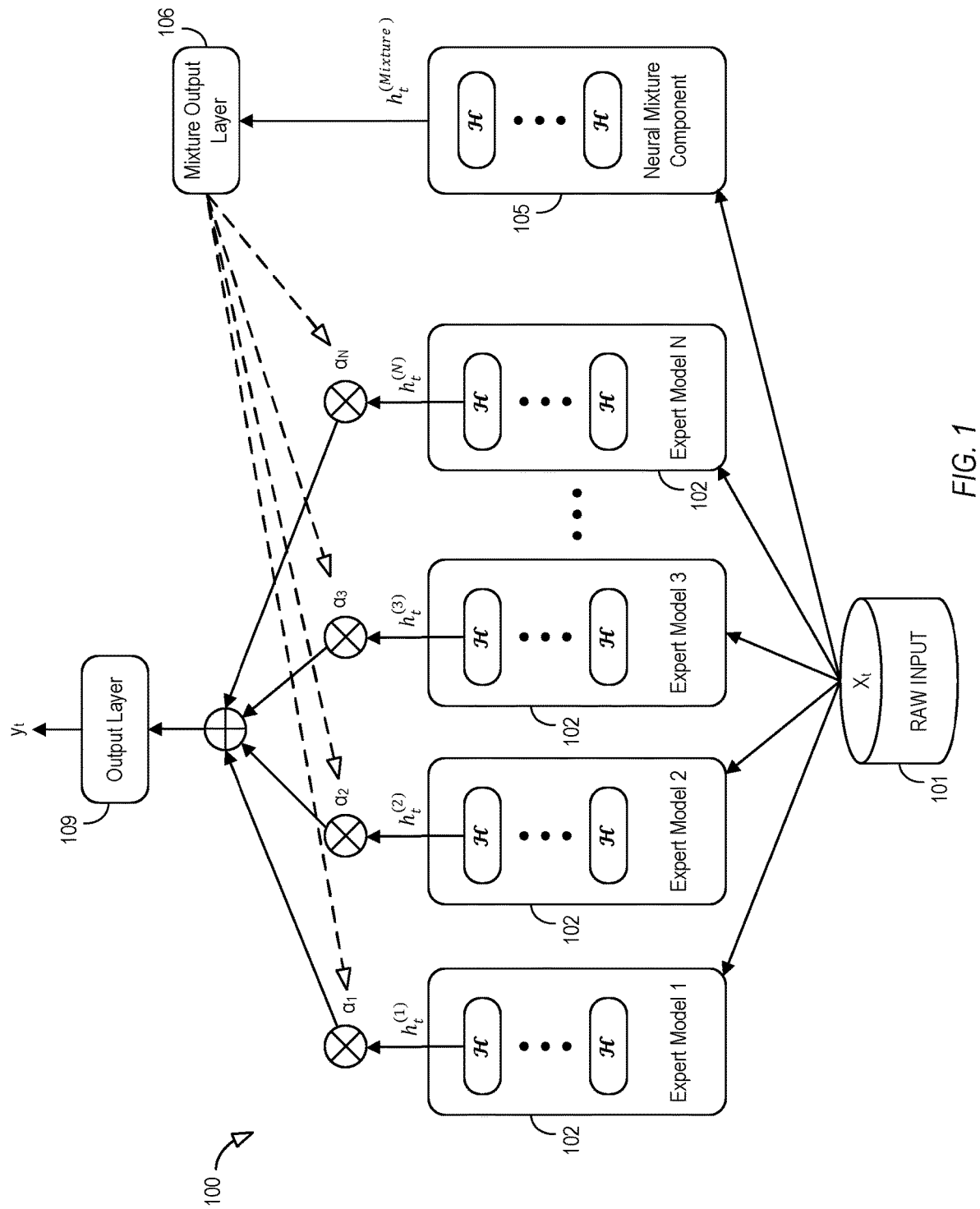
FIG. 1 is a high-level block diagram of a typical recurrent adaptive mixture model.

For example, a Recurrent Adaptive Mixture Model ("RADMM") may be used to train a language model in diverse domains. FIG. 1 is a high-level block diagram of a typical RADMM network 100. Although FIG. 1 is described in connection with Automatic Speech Recognition ("ASR"), embodiments may be associated with any other type of neural network-based models. As illustrated, N domain expert models 102 receive raw input data 101 (e.g., $x_t$ representing frames of audio information containing utterances). Each domain expert model 102 may be trained, for example, to classify speech associated with various domains and generate an output $h_t^{(n)}$. A neural mixture component 105 also receives the raw input and uses that information (via a mixture output layer 106) to assign a weight a to each domain expert model 102. The $h_t$ of each domain expert model 102 is multiplied by the corresponding weight a and is then used to generate a final label posterior vector $y_t$ via an output layer 109 (e.g., comprising softmax and/or wsoft).

Thus, the RADMM network 100 (which may be considered a baseline system for comparison to the embodiments described herein) consists of the following components: multiple stacked LSTMs each representing a domain expert model 102, the mixer LSTM or neural mixture component 105, and a softmax output layer 109. We provide a brief outline of the forward pass operations. Assume there are N domains. An input feature vector $x_t$ at time t is fed to N experts operating in parallel. The nth expert is identified by $LSTM_n$ where n=1, . . . , N. Feed forwarding $x_t$ through $LSTM_n$ results in:

$$(h_t^{(n)}, c_t^{(n)}) = LSTM_n(x_t, h_{t-1}^{(n)}, c_{t-1}^{(n)}) \quad (1)$$

where $h_t^{(n)}$ and $c_t^{(n)}$ are the hidden output and the cell state respectively of the nth expert $LSTM_n$ at time t. The same input $x_t$ is fed to a mixer LSTM ($LSTM_{mix}$) with projection layer followed by softmax activation. This generates the mixture (or expert) weight vector at as follows:

$$(h_t^{(mix)}, c_t^{(mix)}) = LSTM_{mix}(x_t, h_{t-1}^{(mix)}, c_{t-1}^{(mix)}) \quad (2)$$

$$\alpha_t = \mathrm{softmax}(W_{mix} h_t^{(mix)} + b_{mix}) \quad (3)$$

The mixture weight vector $\alpha_t = [\alpha_t^{(1)} \ldots \alpha_t^{(N)}]$ is a vector of probabilities and hence $\Sigma_{n=1}^N \alpha_t^{(n)} = 1$. The mixture weight $\alpha_t^{(n)}$ determines the relevance of the nth expert in producing a unified output $s_t$. Thus, the mixture weights are used in linear combination of the hidden outputs from the experts using:

$$s_t = \Sigma_{n=1}^N \alpha_t^{(n)} h_t^{(n)} \quad (4)$$

Passing $s_t$ through a fully connected layer with softmax activation results in the final label posterior vector as shown:

$$p(l|x_1^t) = \mathrm{softmax}(z_t) \quad (5)$$

where $z_t = W_o s_t + b_o$ is the vector of logits, l is the vector of labels and ($W_o$, $b_o$) are the weight and bias parameters.

The elements of the RADMM network 100 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4-6.

The RADMM gating network 105 is constructed as a mixer long short-term memory ("LSTM") network. However, one problem with this approach is that the gating network is unaware of the state of each domain expert model 102 because it uses the raw inputs 101 to produce the mixture weights. To address this drawback, some embodiments described herein improve the MoE by using expert outputs (or their linear projections) as inputs to the mixer LSTM. Furthermore, in some embodiments vector-based interpolation of the experts may be even more effective as compared scalar interpolation. In addition, some embodiments directly learn the weights of the experts without using any mixer LSTM. Yet other embodiments, introduce a hybrid attention model that uses logits and mixture weights from a previous time step to generate current mixture weights.

Figure 2:
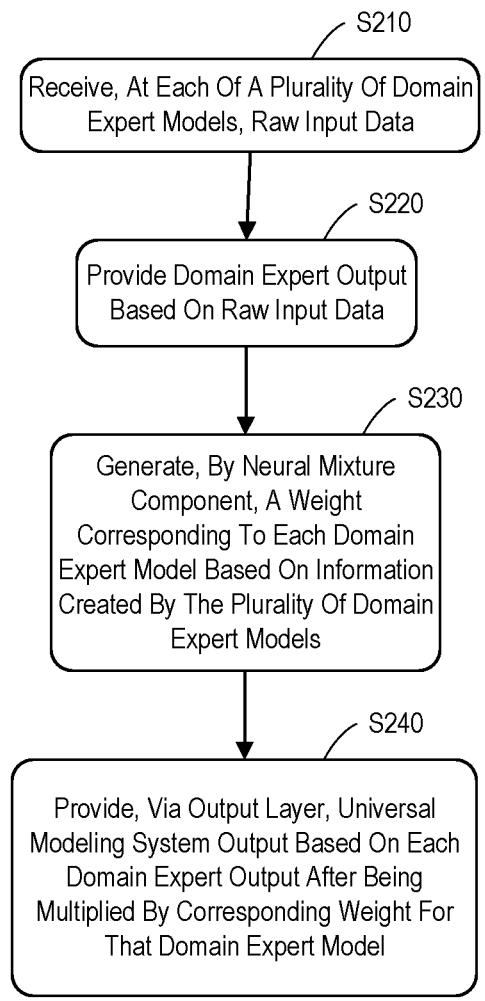
FIG. 2 is a flowchart of a universal acoustic modeling method using neural mixture models in accordance with some embodiments.

A detailed process is provided in FIG. 2 which is a flow diagram of universal acoustic modeling method in accordance with some embodiments. Note that the flowcharts described herein do not imply a fixed order to the steps, and embodiments of the present invention may be practiced in any order that is practicable. Also note that any of the methods described herein may be performed by hardware, software, or any combination of these approaches. For example, a computer-readable storage medium may store thereon instructions that when executed by a machine result in performance according to any of the embodiments described herein. Initially, raw input data may be received at each of a plurality of domain expert models at S210. The raw input data might comprise, for example, a stream of audio frames containing speech utterances.

At S220, each of the plurality of domain expert models may provide a domain expert output based on the raw input data. At S230, a neural mixture component may generate a weight corresponding to each domain expert model based on information created by the plurality of domain expert models. According to some embodiments, the neural mixture component includes an LSTM element. The weights generated at S230 might be associated with constrained scalar numbers (e.g., the probabilities from all domain expert models may need to add up to 1.0), unconstrained scaler numbers, vectors, matrices, etc. As described in connection with FIGS. 3A through 3E, the information created by the plurality of domain expert models might include, by way of examples, hidden features, row convolution, etc.

At S240, an output layer may provide a universal modeling system output based on each domain expert output after being multiplied by the corresponding weight for that domain expert model. The universal modeling system output might be associated with, according to some embodiments ASR.

Since embodiments model AMs using the MoE approach, they are referred to herein as Universal Acoustic Models ("UAMs"). The training strategy of the UAMs is as follows. First, experts in each of N domains are trained separately using large amounts of domain specific data. Then the UAM is constructed by combining K parallel experts with a gating network. While training the UAM, the model parameters of the experts remain unchanged. That is, only the parameters of the gating network are updated using backpropagation.

Figure 3A:
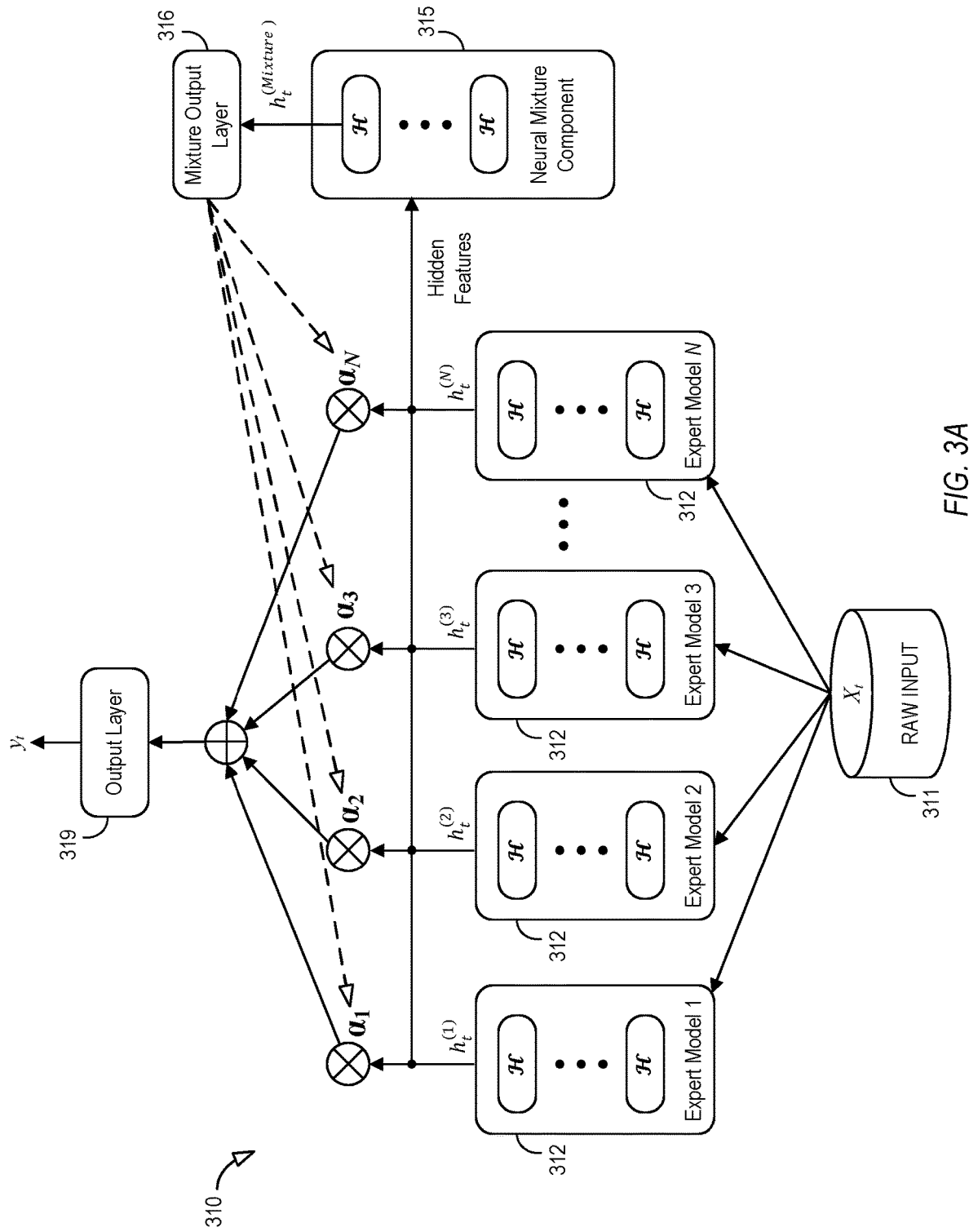
FIG. 3A is a recurrent adaptive mixture model with hidden features system according to some embodiments.

FIG. 3A is a RADMM with hidden features system 310 according to some embodiments (also referred to as RADMM:H). As before, N domain expert models 312 receive raw input data 311 (e.g., $x_t$ representing frames of audio information containing utterances). Each domain expert model 312 may be trained, for example, to classify speech associated with various domains and generate an output $h_t$. A neural mixture component 315 receives information generated by the expert models 312 (e.g., hidden features instead of the raw input) and uses that information (via a mixture output layer 316) to assign a weight a to each domain expert model 312. The $h_t$ of each domain expert model 312 is multiplied by the corresponding weight a and is then used to generate a final label posterior vector $y_t$ via an output layer 319 (e.g., comprising softmax and/or wsoft).

One problem with the baseline RADMM of FIG. 1 is that the mixer LSTM produces mixture weights based on $x_t$. Thus, it is agnostic to the state of the individual experts. One way to incorporate expert knowledge into the mixer LSTM is to feed it with hidden outputs of the expert LSTMs. This can be achieved by stacking the hidden outputs (features) of each expert and feeding the stacked vector to the mixer LSTM. In the preceding equations, equation 2 is replaced by equation 6:

$$(h_t^{(mix)}, c_t^{(mix)}) = LSTM_{mix}(\tilde{h}_t, h_{t-1}^{(mix)}, c_{t-1}^{(mix)}) \quad (6)$$

where, as shown in equation 7:

$$\tilde{h}_t = \begin{bmatrix} h_t^{(1)} \\ h_t^{(2)} \\ \vdots \\ h_t^{(N)} \end{bmatrix} \quad (7)$$

Once $h_t^{(mix)}$ is known, the expert weights are determined using equations 3 through 5.

Figure 3B:
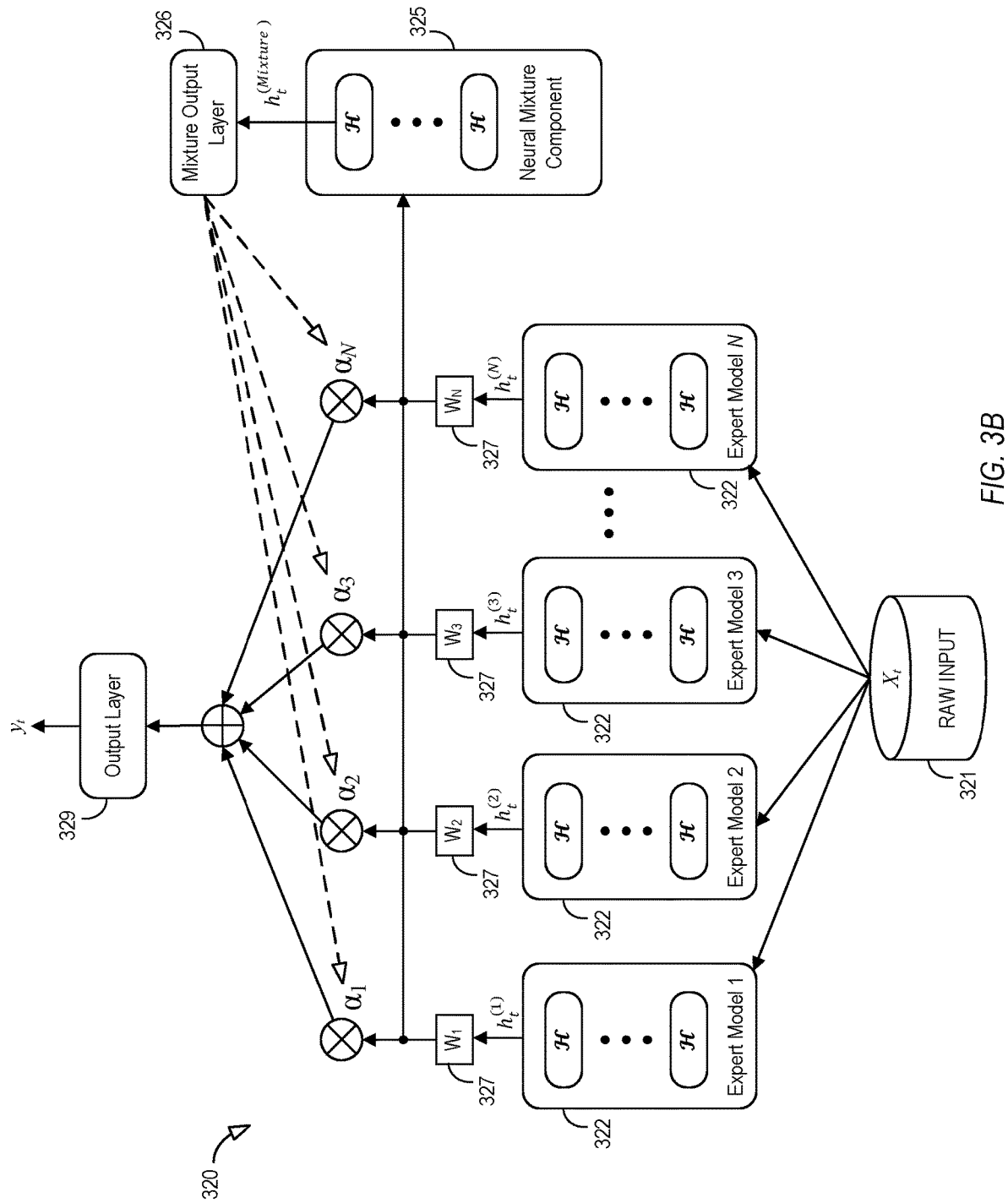
FIG. 3B is a recurrent adaptive mixture model with row convolution system in accordance with some embodiments.

FIG. 3B is a recurrent adaptive mixture model with Row Convolution ("RC") system 320 in accordance with some embodiments (also referred to as RADMM:RC). As before, N domain expert models 322 receive raw input data 321 (e.g., $x_t$ representing frames of audio information containing utterances). Each domain expert model 322 may be trained, for example, to classify speech associated with various domains and generate an output $h_t$. In addition, a linear transform W 327 associated with RC may be applied to $h_t$. A neural mixture component 325 receives information generated by the linear transform W 327 (e.g., hidden features) and uses that information (via a mixture output layer 326) to assign a weight a to each domain expert model 322. The linear transform W 327 output of each domain expert model 322 is multiplied by the corresponding weight a and is then used to generate a final label posterior vector $y_t$ via an output layer 329 (e.g., comprising softmax and/or wsoft).

Note that it may be possible to further improve a RADMM network by projecting the hidden features $h_t^{(mix)}$ of the expert LSTMs to a common subspace. Because the inputs to the domain dependent experts undergo different transformations, it is likely that the hidden features may reside on different subspaces. To alleviate this problem, linear transforms 327, one for each expert 322, may be used to project the hidden features to a common subspace. This is given by:

$$g_t^{(n)} = W_n h_t^{(n)} \quad (8)$$

The projected features can now be stacked column-wise to form $\tilde{g}_t = [g_t^{(1)}, g_t^{(2)} \ldots g_t^{(N)}]^T$. This is fed to the LSTM mixer using:

$$(h_t^{(mix)}, c_t^{(mix)}) = LSTM_{mix}(\tilde{g}_t, h_{t-1}^{(mix)}, c_{t-1}^{(mix)}) \quad (9)$$

The difference between equation 9 and equation 2 (or equation 6) is the use of input $\tilde{g}_t$ instead of $x_t$ (or $\tilde{h}_t$). Following this, the expert weights are determined as usual using equation 3. Instead of $h_t^{(n)}$, $g_t^{(n)}$ is used for linear combination of the states of the experts. Therefore, instead of equation 4, the following is used:

$$s_t = \sum_{n=1}^N \alpha_t^{(n)} g_t^{(n)} \quad (10)$$

Finally, label posteriors are evaluated using equation 5.

Figure 3C:
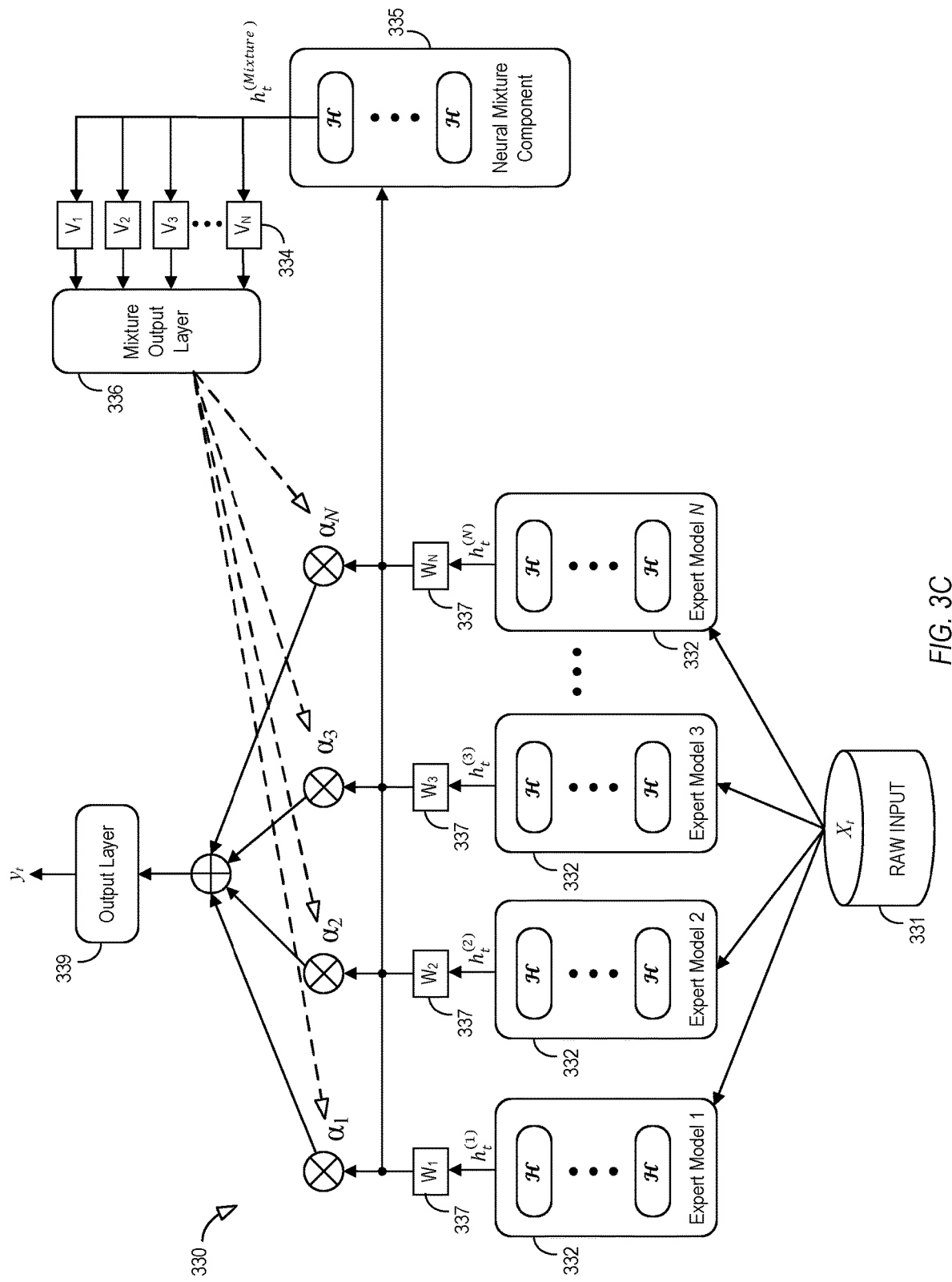
FIG. 3C is a recurrent adaptive mixture model with component weighting system according to some embodiments.

FIG. 3C is a recurrent adaptive mixture model with component weighting system 330 according to some embodiments (also referred to as RADMM:COM). As before, N domain expert models 332 receive raw input data 331 (e.g., $x_t$ representing frames of audio information containing utterances). Each domain expert model 332 may be trained, for example, to classify speech associated with various domains and generate an output $h_t$. In addition, weights W 337 may be applied to $h_t$ and an output of a neural mixture component 335 may be provided to a mixture output layer 336 (after V 334 is applied) to create a for each expert model 332.

Note that previously described embodiments (e.g., associated with FIGS. 3A and 3B) have been restricted to the inputs of the mixer LSTM. However, it is possible to improve the outputs by introducing component-wise (or element-wise) weighting of the outputs from the experts. This means instead of using scalar weight $\alpha_t^{(n)}$ for each expert, we use a vector of weights in $\alpha_t^{(n)}$. This can be attained as follows. Assume $h_t^{(mix)}$ is available from the mixer LSTM. A scoring vector $e_t^{(n)} \in \mathbb{R}^J$ is generated for each expert after passing $h_t^{(mix)}$ through an affine transform $(V_n, b_n)$, one for each expert, using:

$$e_t^{(n)} = V_n h_t^{(mix)} + b_n \quad (11)$$

A J×N scoring matrix E is then constructed by stacking the scoring vectors column-wise as shown:

$$E = \begin{bmatrix} | & | & & | \\ e_t^{(1)} & e_t^{(2)} & \ldots & e_t^{(N)} \\ | & | & & | \end{bmatrix} \quad (12)$$

Keeping the $j^{th}$ row fixed in E, mixture weights are computed by using softmax normalization across experts. Thus, for the $n^{th}$ expert and the $j^{th}$ component, the mixture weight $\alpha_t^{(n)}(j)$ is computed using:

$$\alpha_t^{(n)}(j) = \frac{\exp(e_t^{(n)}(j))}{\sum_{n'=1}^N \exp(e_t^{n'}(j))}, j = 1, \ldots, J \quad (13)$$

where $\sum_{n=1}^N \alpha_t^{(n)}(j) = 1, \forall j \in \{1, \ldots, J\}$. Now the projected features $g_t^{(n)}$ are linearly combined component-wise with the weight vector $\alpha_t^{(n)}$ as:

$$s_t = \sum_{n=1}^N \odot h_t^{(n)} \quad (14)$$

from which label posteriors are calculated using equation 5.

Figure 3D:
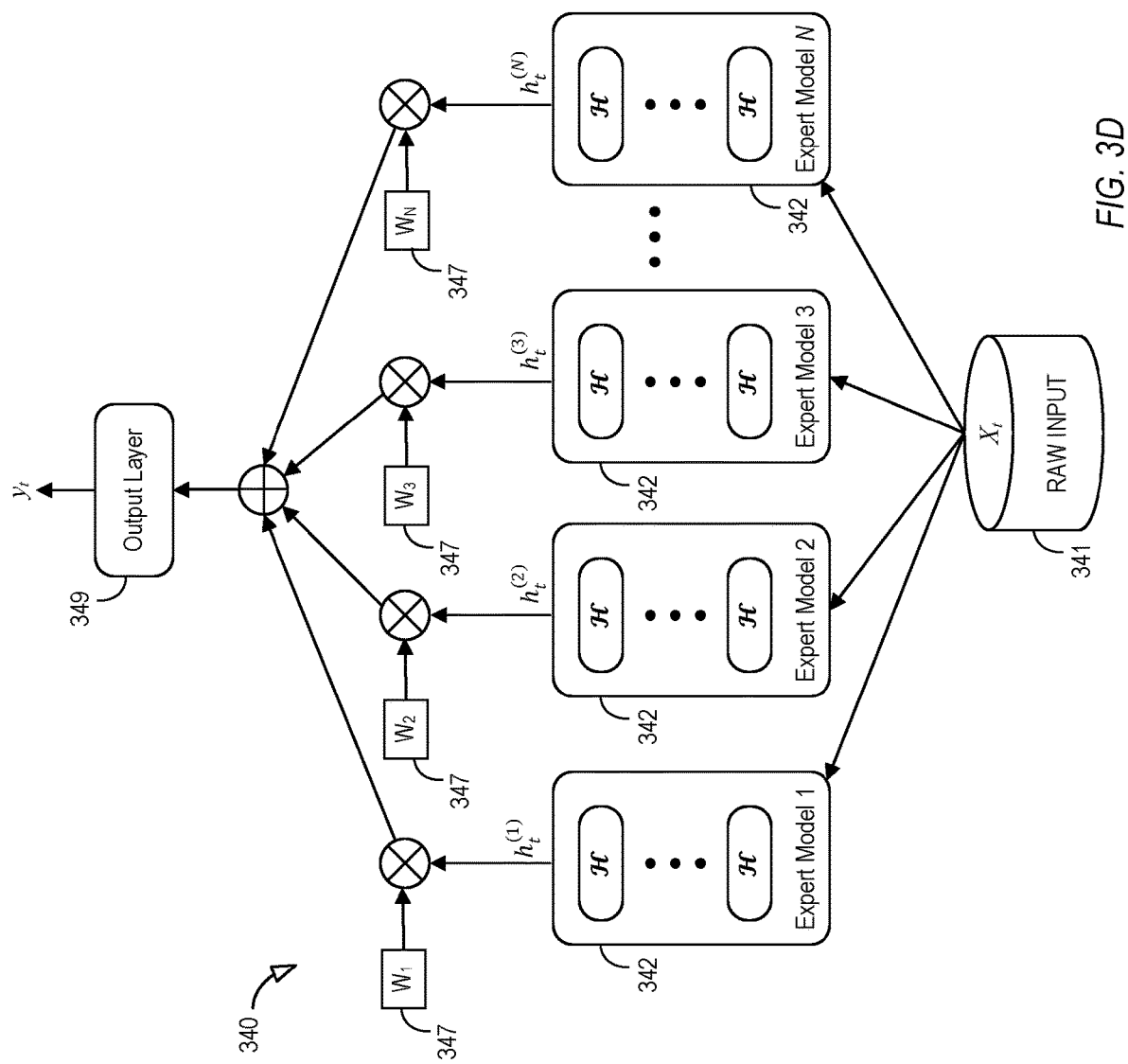
FIG. 3D is a hidden layer interpolation mixture model system in accordance with some embodiments.

FIG. 3D is a Hidden Layer Interpolation Mixture Model ("HLIMM") system 340 in accordance with some embodiments). As before, N domain expert models 342 receive raw input data 341 (e.g., $x_t$ representing frames of audio information containing utterances). Each domain expert model 342 may be trained, for example, to classify speech associated with various domains and generate an output $h_t$. In addition, unconstrained learned vector weights W 347 may be combined with $h_t$. Note that no neural mixture component is required. The combination of W 347 and $h_t$ is used to generate a final label posterior vector $y_t$ via an output layer 349 (e.g., comprising softmax and/or wsoft).

A simple way of combining the hidden outputs from the experts is to learn a distinct weight vector $w_n$ for each expert. Then the learned vector can be used in component-wise linear combination of the hidden outputs. This is given by:

$$s_t = \sum_{n=1}^{N} w_n \odot h_t^{(n)} \qquad (15)$$

Then $s_t$ can be used to compute label posteriors using equation 5. There are some key differences between RADMM and HLIMM. First, there is no mixer LSTM in HLIMM. Second, the linear combination step in equations 4, 14, and 15 differ in the way the weights are computed. While the weights in the former are constrained to probability values, they remain unconstrained in the latter. As will be shown later, HLIMM performed reasonably well despite its simplicity. One problem with the trained weights in HLIMM is that they do not change with the change in input test data. Thus, these weights do not generalize well for new scenarios. Therefore, a better way is to generate these weights online based on the input test data.

Figure 3E:
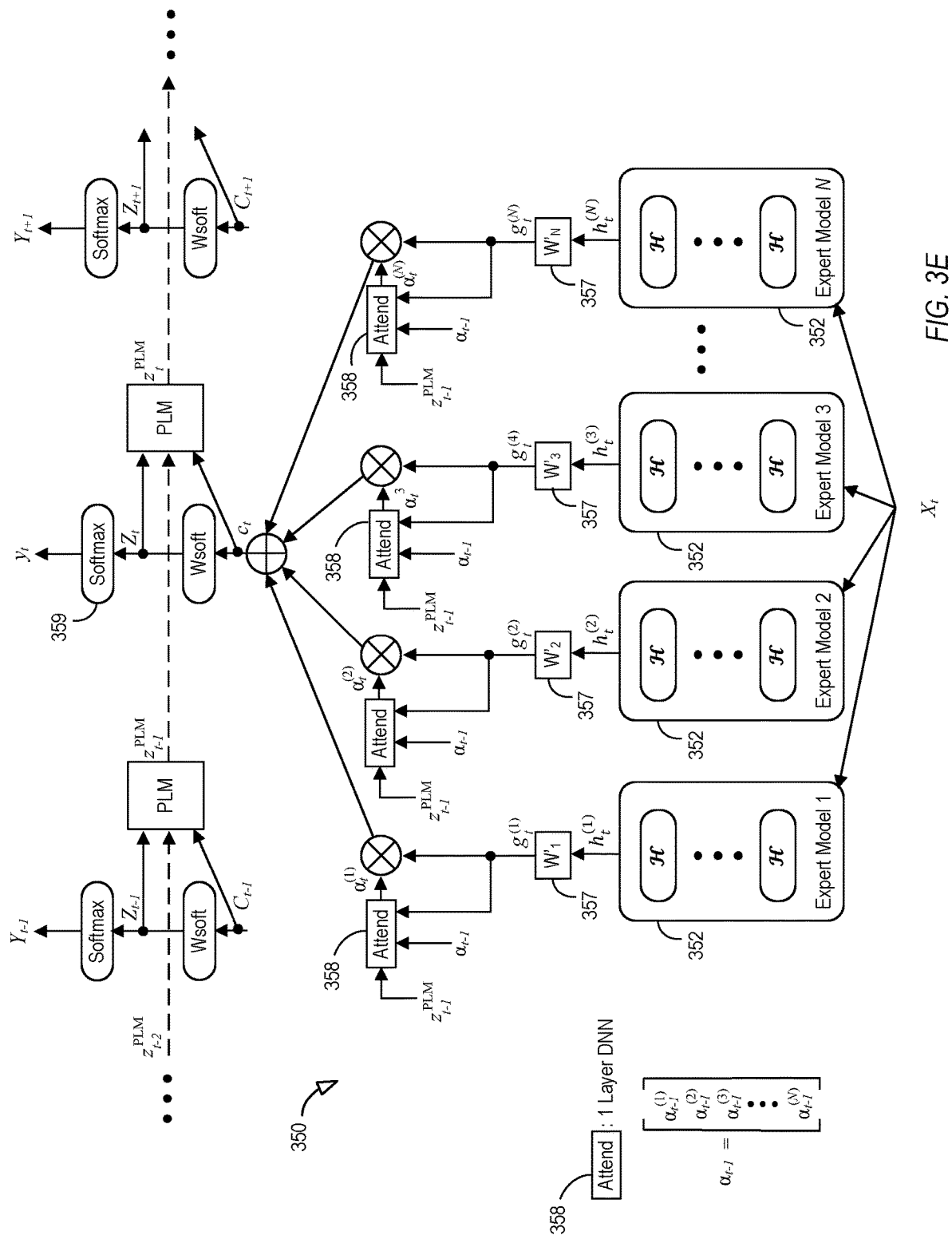
FIG. 3E is a hybrid attention mixture model system according to some embodiments.

FIG. 3E is a Hybrid Attention Mixture Model ("HAMM") system 350 according to some embodiments. As before, N domain expert models 352 receive raw input data 351 (e.g., $x_t$ representing frames of audio information containing utterances). Each domain expert model 352 may be trained, for example, to classify speech associated with various domains and generate an output $h_t$. In addition, a linear transform W 357 associated with RC may be applied to $h_t$. As illustrated in FIG. 3E, an Attend network 358 may be used to generate a weight $\alpha$ associated with each domain expert model 352. The output layer 359 uses softmax, wsoft, and a Pseudo Language Model ("PLM") to generate a final label posterior vector $y_t$ as will now be described, This approach finds mixture weights using an attention model, and the main components are: (a) the generation of context vectors as Row Convolution ("RC") features, and (b) the computation of the weights of the hidden features using an attention mechanism. The context vector $s_t$ can be computed as an RC feature by convolving the hidden feature $h_t^{(n)}$ with learnable weight matrices $W_n$. The generation of the RC features and linearly combining them is similar to equations 8 and 10, respectively. However, the difference lies in the way mixture weights $\alpha_t(n)=1, \ldots, N$ are determined. Thus, $s_t$ is given by:

$$s_t = \sum_{n=1}^{N} W_n h_t^{(n)} = \gamma \sum_{n=1}^{N} \alpha_t^{(n)} g_t^{(n)} \qquad (16)$$

where the second step holds when $$\alpha_t(n) = \frac{1}{N}$$

and $\gamma=N$. This is the case for uniform weighting of experts. The term $\gamma$ is an additional scaling factor that benefits training. For non-uniform weighting, an Attend(.) network is used to learn the mixture weights (attention weights) using:

$$\alpha_t = \text{Attend}(z_{t-1}, \alpha_{t-1}, g) \qquad (17)$$

where $z_{t-1}$ is the logits vector (see equation 5) from the previous time step and $g=[g_t^{(1)}, \ldots, g_t^{(N)}]$. The Attend(.) function consists of two parts: a scoring function Score(.) followed by normalization. The Score(.) function is a single layer DNN given by:

$$e_t^{(n)} = \text{Score}(z_{t-1}, \alpha_{t-1}, g_t^{(n)}), n = 1, \ldots, N \qquad (18)$$

$$= \begin{cases} v^T \tanh(V' f_t + W' g_t^{(n)} + b'), & \text{(location)} \\ v^T \tanh(U' z_{t-1} + W' g_t^{(n)} + V' f_t + b'), & \text{(hybrid)} \end{cases} \qquad (19)$$

where $f_t = F * \alpha_{t-1}$ and $*$ is the convolution operation. Equation 19 represents Hybrid Attention ("HA") if it encodes both content ($z_{t-1}$) and location ($\alpha_{t-1}$) information. In the absence of $z_{t-1}$, it represents only Location Attention ("LA"). Mixture weights are generated after normalizing the scores using:

$$\alpha_t^{(n)} = \frac{\exp(e_t^{(n)})}{\sum_{n'=1}^{N} \exp(e_t^{(n')})}, n = 1, \ldots, N \qquad (20)$$

The performance of the attention model in equation 17 can be improved further by providing content information that is more reliable than $z_{t-1}$. This is possible by introducing another recurrent network that can utilize content from several time steps in the past instead of only one step. This network, in essence, would learn an implicit Language Model ("LM") or Pseudo Language Model ("PLM") and can be represented as:

$$z_{t-1}^{PLM} = \mathcal{H}(x_{t-1}, z_{t-2}^{PLM}), x_{t-1} = \begin{bmatrix} z_{t-1} \\ s_{t-1} \end{bmatrix} \qquad (21)$$

$$\alpha_t = \text{Attend}(z_{t-1}^{PLM}, \alpha_{t-1}, g) \qquad (22)$$

where $\mathcal{H}(.)$ is a LSTM unit. Additional gains can be achieved using component-wise attention.

While some implementations will be described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
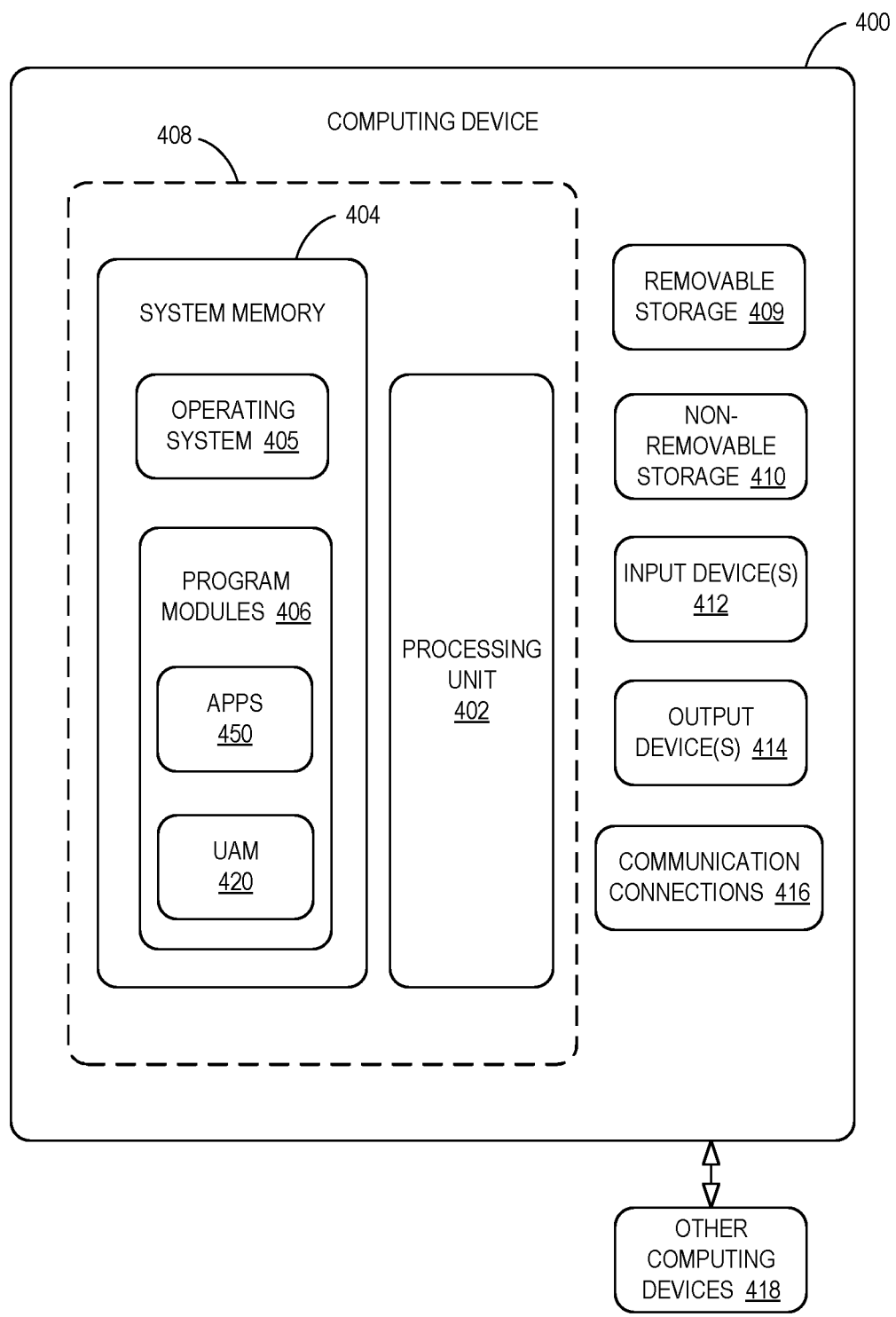
FIG. 4 is a block diagram illustrating example physical components of a computing device in accordance with some embodiments.
Figure 5A:
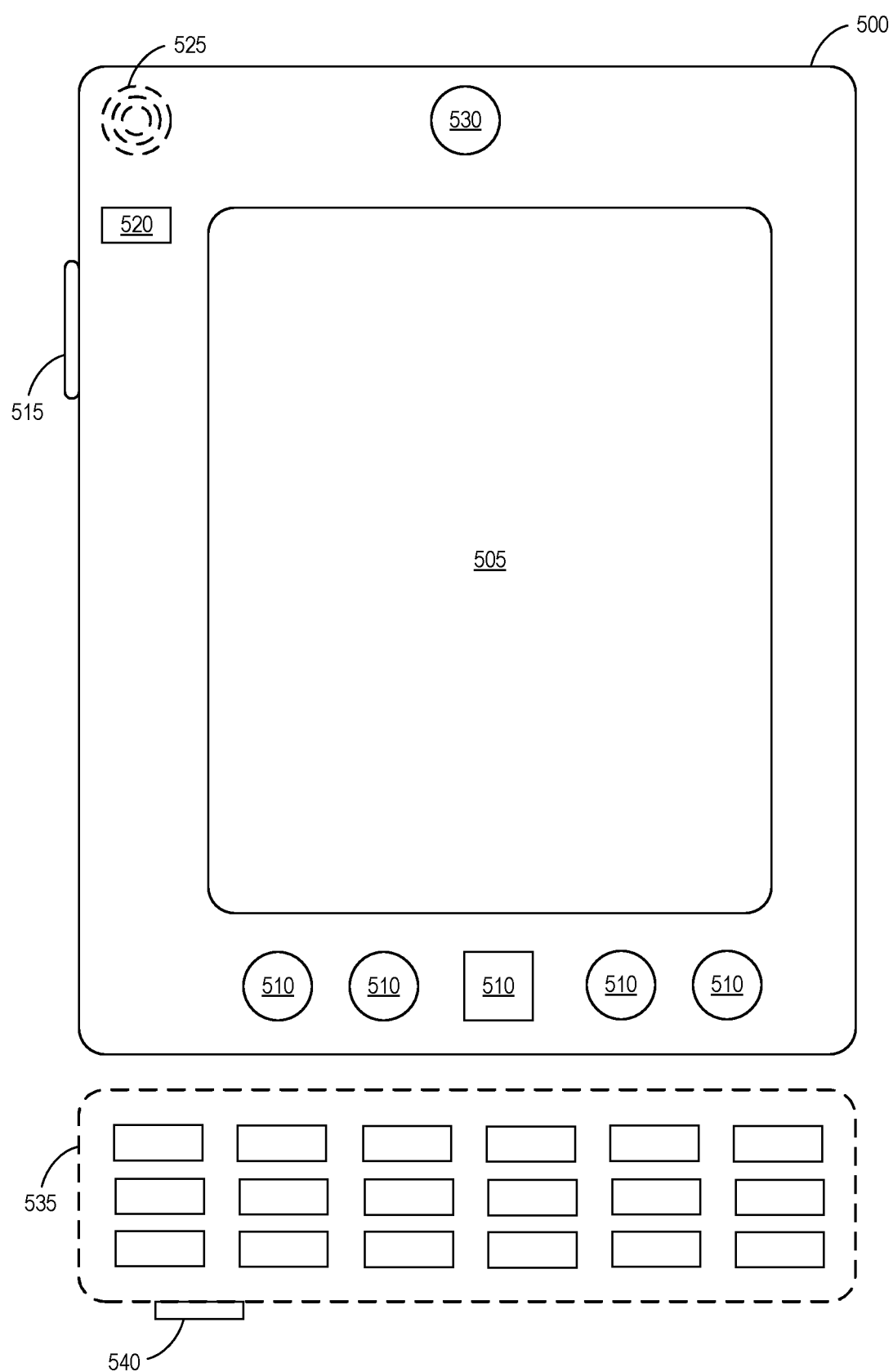
FIGS. 5A and 5B are block diagrams of a mobile computing device according to some embodiments.
Figure 5B:
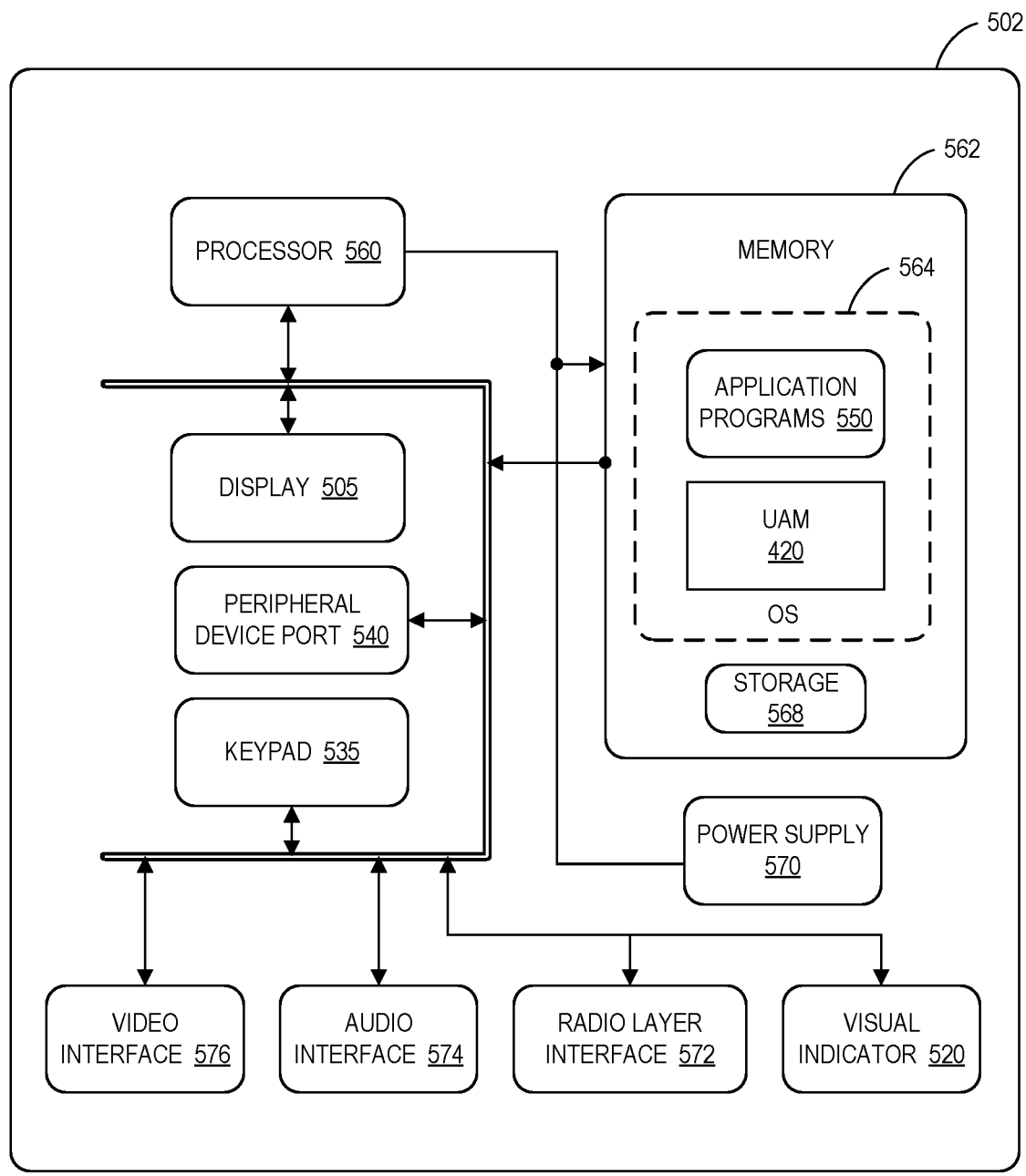
Figure 6:
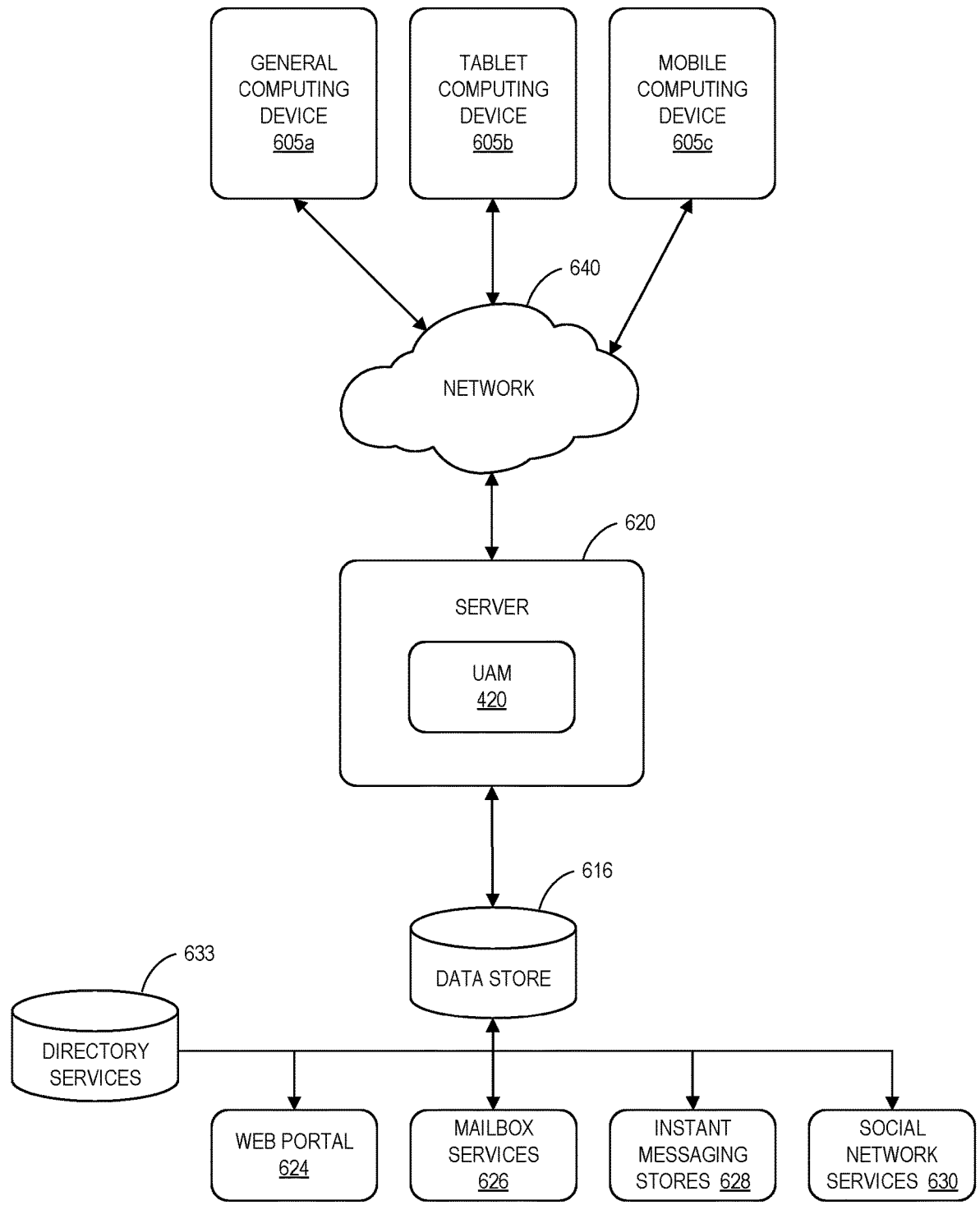
FIG. 6 is a block diagram of a distributed computing system in accordance with some embodiments

FIGS. 4 through 6 and the associated descriptions provide a discussion of a variety of operating environments in which examples are practiced. However, the devices and systems illustrated and discussed with respect to FIGS. 4 through 6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the UAM 420 in accordance with any of the embodiments described herein. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., MT platform 120 in accordance with any of the embodiments described herein) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, Radio Frequency ("RF") transmitter, receiver, and/or transceiver circuitry; Universal Serial Bus ("USB"), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, Electrically Erasable Programmable Read-Only Memory ("EEPROM"), flash memory or other memory technology, CD-ROM, Digital Versatile Disks ("DVD") or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, RF, infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a Graphical User Interface ("GUI"), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., an HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., an HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated Personal Digital Assistant ("PDA") and wireless phone.

According to an aspect, one or more application programs 550 are loaded into the memory 562 and run on or in association with the operating system 564. Examples of the application programs include phone dialer programs, e-mail programs, Personal Information Management ("PIM") programs, word processing programs, spreadsheet programs, Internet browser programs, messaging programs, and so forth. According to an aspect, UAM 420 in accordance with any of the embodiments described herein and/or one or more speech recognition models may be loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a Light Emitting Diode ("LED") and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic speech recognition as described above. Content developed, interacted with, or edited in association with the UAM 420 in accordance with any of the embodiments described herein is enabled to be stored in different communication channels or other storage types. For example, various documents may be stored using a directory service 622, a web portal 624, a mailbox service 626, an instant messaging store 628, or a social networking site 630. The UAM 420 in accordance with any of the embodiments described herein is operative to use any of these types of systems or the like to perform ASR. According to an aspect, a server 620 provides the UAM 420 in accordance with any of the embodiments described herein to clients 605a, 605b, 605c. As one example, the server 620 is a web server providing the UAM 420 in accordance with any of the embodiments described herein over the web. The server 620 provides the UAM 420 in accordance with any of the embodiments described herein over the web to clients 605 through a network 640. By way of example, the client computing device is implemented and embodied in a personal computer 605a, a tablet computing device 605b, or a mobile computing device 605c (e.g., a smart phone), or other computing device. Any of these examples of the client computing device are operable to obtain content from the store 616.

Figure 7:
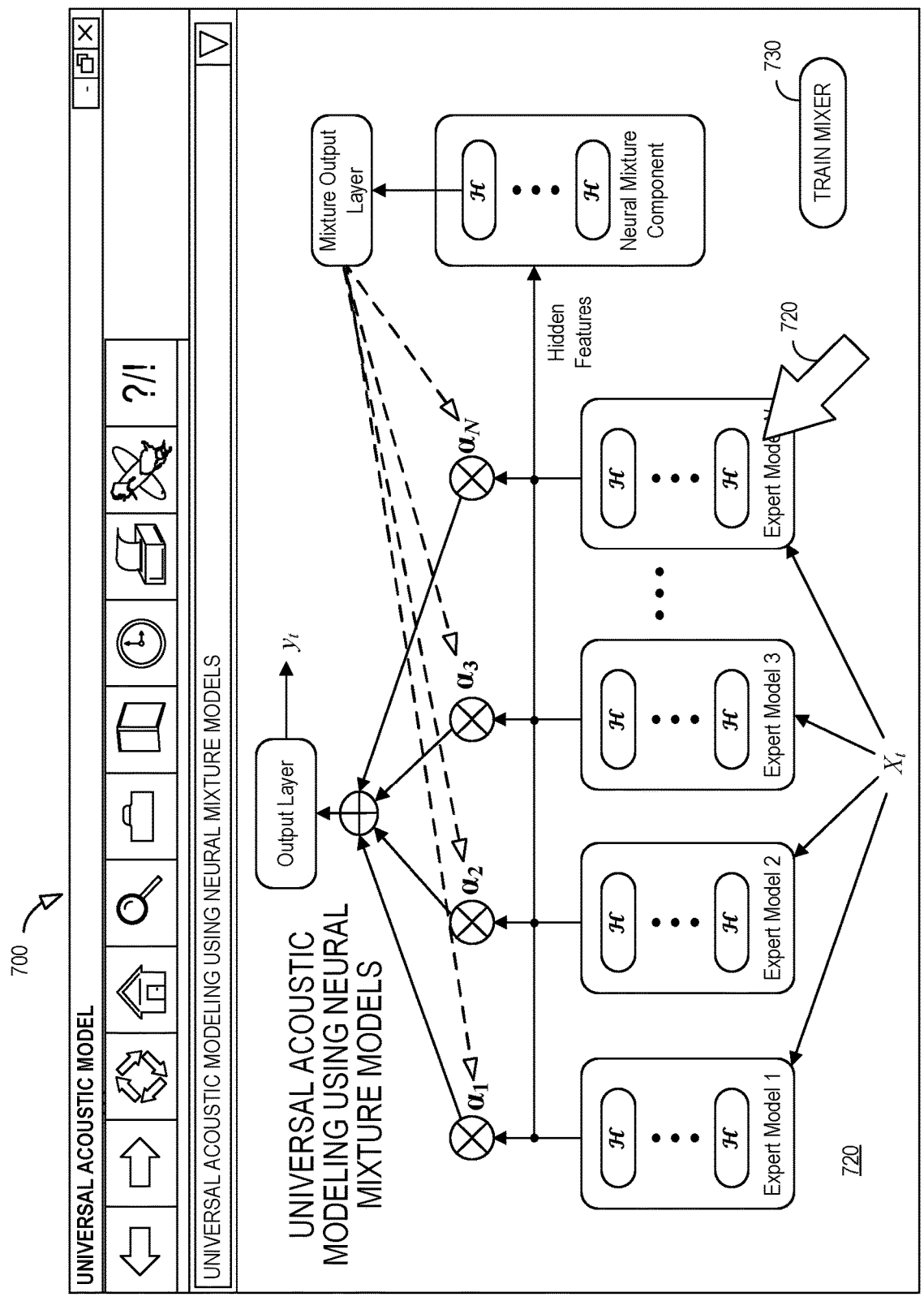
FIG. 7 is an operator or administrator display associated with universal acoustic modeling in accordance with some embodiments.

An operator or administrator may view and/or adjust parameters associated with a UAM system in accordance with any of the embodiments described herein. For example, FIG. 7 is UAM display 700 in accordance with some embodiments. The display 700 includes graphical elements 710 representing an acoustic model in accordance with any of the embodiments described herein. Selection of various elements 710 (e.g., via a touchscreen or computer mouse pointer 720) may result in a display of additional details about that element 710 (e.g., via pop-up window) and/or provide the operator or administrator with a chance to alter or adjust properties of that element 710. For example, the operator or administrator might adjust model parameters, update training sets, adjust LSTM or DNN configurations, etc.

Several UAMs using RNNs as mixture of experts were evaluated. A baseline RADMM model was modified by using a combination of hidden features, row convolution, and vector weights. A simple UAM which finds mixture weights without using any mixer LSTM was also introduced along with an attention model that uses location and content information to find mixture weights. The baseline and proposed methods were evaluated on speech collected from a wide variety of acoustic conditions. Comparing the baseline RADMM and the best proposed HAMM models, a relative reduction in Word Error Rate ("WER") of about 21.12%, 19.78%, and 20.48% occurred in seen, unseen, and combined conditions respectively. Moreover, the HAMM models beat an oracle model that picked the best expert for a given test condition.

Transcribed data was collected from a wide variety of acoustic conditions, include search assistants, conversations, meetings etc. Information was categorized into two groups: seen and unseen. For the seen group (S1-S4), the acoustic conditions during training and testing were identical. For the unseen group (U1-U4), there was a mismatch in the acoustic conditions between training and testing.

Four experts were trained (hence, K=4), one per condition, using 30,000 hours of data (cumulative) across S1-S4. Each expert was a 6-layer uni-directional LSTM trained with frame-wise cross entropy criterion. The LSTMs were equipped with 1,024 memory cells in each layer and the cell outputs were linearly projected to 512 dimensions. Then, keeping the parameters of the expert LSTMs constant, UAMs were trained using only 300 hours of data (1% of expert data) in S1-S4. For component-wise weighting, J=64. The input feature was 80-dimension log Mel filter bank. Frame skipping was applied to reduce the runtime cost. The language model was a 5-gram with around 100 million (M) ngrams.

WERs of the 4 expert models tested in S1-S4 and U1-U4 are presented in Table 1. In particular, Table 1 shows WERs of expert models in various seen and unseen test conditions. Expert models Sn, n=1, . . . , 4 are named after the acoustic conditions they were trained in.

For the seen cases S1-S4, the best model was the one whenever there was a match between the training and test conditions. For the unseen cases U1-U4, the WERs are relatively worse due to the mismatch between training and test conditions. However, one can infer that the best performing model is the one whose train condition was closest to the test condition. For example, expert model (S1) was trained in a condition that is acoustically closer to the conditions in U1 and U4. For a given test condition, the best expert model (oracle) will always pick the best performing expert among the ensemble of experts.

Table 2 presents the weighted average WER for various UAMs tested separately under three conditions—seen (S1-S4), unseen (U1-U4), and combined (S1-S4, U1-U4). For example, in the first column, the system computed the weighted average WER of a UAM by computing the WER in each condition S1 through S4, weighting each WER by the word count factor (in Table 1), and then summing the weighted WERs.

In the first column (S1-S4), RADMM:H outperformed the baseline (RADMM). This proves that making the mixer LSTM expert-aware benefits UAM. A sharp drop in WER when using HLIMM indicates that directly learning the vector weights without using a mixer LSTM is also an effective way to model UAMs. Experiments were also performed with learning scalar weights. However, the did not consistently improve over the baseline model. Adding row convolution (RADMM:RC) and component-wise weighting (RADMM:COM) further lowered the WER. RADMM:COM and HLIMM were similar from the perspective that they both use vector weights. However, RADMM:COM outperforming HLIMM is perhaps due to two reasons. First, RADMM:COM generates mixture weights that change with the change in input test data. However, as previously described, the weights in HLIMM remain constant once training is complete. Second, the mixer LSTM is better at capturing long-term state information than HLIMM. The most advanced models are the HAMM models outperforming both RADMM and HLIMM models. Within HAMM, HA slightly outperformed LA since both location and content information were included in learning the attention weights. Comparing HAMM:HA with the best models of Table 1, it is clear that HAMM:HA model has achieved an oracle-like performance. Likewise, in the second column (U1-U4), most notable is the performance of HAMM models since they easily outperform RADMM, HLIMM, and Table 1 models. In the third column (combined) again, the best performing models are HAMM based models.

Table 2 provides the weighted average WERs of various UAMs tested under seen conditions S1-S4, unseen (U1-U4), and combined conditions (S1-S4, U1-U4). The UAMs were trained with 300 hours of training data

TABLE 2

| Test Cond. | Word Count | Expert Models | | | | | UAM | WER | | |
|---|---|---|---|---|---|---|---|---|---|---|
| ↓ | | S1 | S2 | S3 | S4 | | | S1-S4 | U1-U4 | Combined |
| S1 | 34150 | 11.45 | 12.91 | 16.71 | 18.71 | | RADMM | 16.24 | 19.72 | 17.68 |
| S2 | 32134 | 13.04 | 6.97 | 23.83 | 23.14 | | RADMM:H | 16.07 | 18.91 | 17.25 |
| S3 | 46471 | 19.73 | 50.12 | 14.10 | 15.70 | | HLIMM | 13.76 | 16.37 | 14.84 |
| S4 | 21690 | 30.87 | 51.66 | 21.51 | 20.69 | | RADMM:RC | 13.08 | 16.19 | 14.37 |
| U1 | 22618 | 16.39 | 17.36 | 22.64 | 23.39 | | RADMM:COM | 12.92 | 16.40 | 14.36 |
| U2 | 29480 | 37.90 | 19.70 | 33.60 | 25.84 | | HAMM:LA | 12.92 | 15.80 | 14.11 |
| U3 | 28553 | 14.91 | 32.37 | 14.54 | 14.47 | | HAMM:HA | 12.81 | 15.82 | 14.06 |
| U4 | 14715 | 13.69 | 18.60 | 15.55 | 19.99 | | Oracle | 12.79 | 16.42 | 14.30 |

Table 3 outlines further gains achieved by HAMM:HA model when additional data were added during training. Gains were observed when training using three times (3x)

larger data. Gains were also obtained when training with additional 10 hours of data from the unseen domain U3. This also proves the following. To train experts, the system requires large amounts of transcribed data in a wide variety of conditions which may not be always feasible. However, in the absence of experts, the UAMs can be effective even if small amounts of data can be added during training from a wide variety of new acoustic conditions. The UAMs are able to learn these new conditions by finding an interpolation between the acoustic conditions prevalent in experts. In particular, Table 3 shows weighted average WERs of HAMM based UAMs when training with additional data.

TABLE 3

| UAM | Data | WER | | |
|---|---|---|---|---|
| | | S1-S4 | U1-U4 | Combined |
| HAMM:HA + 3x | 900 hours | 12.68 | 15.71 | 13.94 |
| HAMM:HA + U3 | 310 hours | 12.75 | 15.52 | 13.90 |

Finally, Table 4 summarizes the performance of the baseline (RADMM:R) and the best proposed model (HAMM:HA) when trained with 300 hours of data. On an average, around 20% relative improvement was observed in WER of HAMM:HA model over RADMM model consistently in each test condition. Moreover, the best proposed model outperformed the oracle model. In particular, Table 4 shows a summary of weighted average WER of UAMs: Baseline (RADMM:R) vs best proposed (HAMM:HA).

TABLE 4

| Test Cond. | RADMM:R | HAMM:HA | Abs. WER ↓ | Rel. WER ↓ |
|---|---|---|---|---|
| S1-S4 | 16.24 | 12.81 | 3.43 | 21.12 |
| U1-U4 | 19.72 | 15.82 | 3.90 | 19.78 |
| Combined | 17.68 | 14.06 | 3.62 | 20.48 |

Some implementations are described herein with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Thus, embodiments may provide systems and methods to accurately and efficiently improve domain expert model output mixing. The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A universal modeling system that performs domain expert model mixing, said universal modeling system comprising:
a plurality of domain expert models, each of which receives raw input data and generates a corresponding domain expert output based on the raw input data such that multiple domain expert outputs are generated;
a neural mixture component that receives an input of a stacked vector comprising a stacking of the multiple domain expert outputs and that generates a respective weight corresponding to each one of said domain expert models such that multiple weights are generated, said multiple weights being generated based on the multiple domain expert outputs that were received from and generated by the plurality of domain expert models; and
an output layer that provides a universal modeling system output, the universal modeling system output is generated based on each domain expert's corresponding domain expert output and that same domain expert's corresponding weight, which was generated based on the multiple domain expert outputs.

2. The universal modeling system of claim 1, wherein the raw input data is a stream of audio frames comprising speech utterances, and wherein the universal modeling system output is associated with automatic speech recognition.

3. The universal modeling system of claim 1, wherein the multiple domain expert outputs created by the plurality of domain expert models comprises hidden features.

4. The universal modeling system of claim 3, wherein the neural mixture component includes a Long Short-Term Memory ("LSTM") element.

5. The universal modeling system of claim 1, wherein the multiple weights comprise at least one of: (i) constrained scalar numbers, (ii) unconstrained scaler numbers, (iii) vectors, and (iv) matrices.

6. The universal modeling system of claim 1, wherein the multiple domain expert outputs created by the plurality of domain expert models are associated with row convolution.

7. The universal modeling system of claim 1, wherein the neural mixture component is associated with learned, unconstrained vector weights generated based on hidden features, the vector weights being distributed among each of the plurality of domain expert models to provide learned hidden interpolation.

8. The universal modeling system of claim 1, wherein a single layer Deep Neural Network ("DNN") is applied to each of the plurality of domain expert models to provide a hybrid attention mixture model.

9. A computer implemented method for performing domain expert model mixing, the method comprising:
receiving, at each domain expert model included in a plurality of domain expert models, raw input data;
generating, from each of the domain expert models in the plurality, a corresponding domain expert output based on the raw input data such that multiple domain expert outputs are generated;
providing the multiple domain expert outputs to a neural mixture component, providing the multiple domain expert outputs to the neural mixture component comprises stacking the multiple domain expert output together into a stacked vector and feeding the stacked vector as a singular input to the neural mixture component;
generating, by the neural mixture component, a respective weight corresponding to each one of said domain expert models such that multiple weights are generated, said multiple weights being generated based on the multiple domain expert outputs that were received from and generated by the plurality of domain expert models; and providing, via an output layer, a universal modeling system output, the universal modeling system output is generated based on each domain expert's corresponding domain expert output and that same domain expert's corresponding weight, which was generated based on the multiple domain expert outputs.

10. The method of claim 9, wherein the raw input data is a stream of audio frames comprising speech utterances, and wherein the universal modeling system output is associated with automatic speech recognition.

11. The method of claim 9, wherein the multiple domain expert outputs generated by the plurality of domain expert models comprise hidden features.

12. The method of claim 11, wherein the neural mixture component includes a Long Short-Term Memory ("LSTM") element.

13. The method of claim 9, wherein the multiple weights comprise at least one of: (i) constrained scalar numbers, (ii) unconstrained scaler numbers, (iii) vectors, and (iv) matrices.

14. The method of claim 9, wherein the multiple domain expert outputs generated by the plurality of domain expert models are associated with row convolution.

15. The method of claim 9, wherein the neural mixture component is associated with learned, unconstrained vector weights generated based on hidden features, the vector weights being distributed among each of the plurality of domain expert models to provide learned hidden interpolation.

16. The method of claim 9, wherein a single layer Deep Neural Network ("DNN") is applied to each of the plurality of domain expert models to provide a hybrid attention mixture model.

17. One or more hardware storage devices that store instructions that are executable by one or more processors of a computer system to cause the computer system to:

at each domain expert model in a plurality of domain expert models, receive a stream of raw input audio frames comprising speech utterances;

cause each of the domain expert models to generate a corresponding domain expert output based on the raw input data such that multiple domain expert outputs are generated;

provide the multiple domain expert outputs to a neural mixture component, providing the multiple domain expert outputs to the neural mixture component comprises stacking the multiple domain expert output together into a stacked vector and feeding the stacked vector as a singular input to the neural mixture component;

generate, using the neural mixture component, a respective weight corresponding to each one of said domain expert models such that multiple weights are generated, said multiple weights being generated based on the multiple domain expert outputs that were received from and generated by the plurality of domain expert models; and cause an output layer to provide a universal Automatic Speech Recognition ("ASR") output, the universal ASR output is generated based on each domain expert's corresponding domain expert output and that same domain expert's corresponding weight, which was generated based on the multiple domain expert outputs.

18. The one or more hardware storage devices of claim 17, wherein the multiple domain expert outputs generated by the plurality of domain expert models comprise hidden features.

19. The one or more hardware storage devices of claim 18, wherein the neural mixture component includes a Long Short-Term Memory ("LSTM") element.

20. The one or more hardware storage devices of claim 17, wherein the multiple weights comprise at least one of: (i) constrained scalar numbers, (ii) unconstrained scaler numbers, (iii) vectors, and (iv) matrices.

21. The method of claim 9, wherein the multiple domain expert outputs include hidden features, at least some of which initially reside in different subspaces as a result of the plurality of domain expert models applying different transformations to the raw input data, and wherein the method further includes:

projecting the hidden features to a common subspace.

* * * * *